United States Patent [19]
Kane et al.

[11] Patent Number: 6,119,814
[45] Date of Patent: Sep. 19, 2000

[54] WHEEL RIM SOAPER

[75] Inventors: John P. Kane, Sterling Heights; Karl D. Sachs, Birmingham, both of Mich.

[73] Assignee: Aim Automotive Integrated Manufacturing, Inc., Sterling Heights, Mich.

[21] Appl. No.: 09/327,055

[22] Filed: Jun. 7, 1999

[51] Int. Cl.[7] .............................. F16N 25/04; F16N 7/24
[52] U.S. Cl. ............................................................ 184/101
[58] Field of Search .................................. 157/1; 184/16, 184/101, 102

[56] References Cited

U.S. PATENT DOCUMENTS

| | | |
|---|---|---|
| 3,658,152 | 4/1972 | Mueller . |
| 4,181,170 | 1/1980 | Price et al. . |
| 4,563,975 | 1/1986 | Kozlowski et al. . |
| 4,638,756 | 1/1987 | Collmann . |
| 4,723,563 | 2/1988 | Kane . |
| 4,834,159 | 5/1989 | Burger . |
| 5,562,773 | 10/1996 | Church . |
| 5,642,790 | 7/1997 | Kane et al. . |

*Primary Examiner*—Dirk Wright
*Attorney, Agent, or Firm*—Young & Basile, P.C.

[57] ABSTRACT

An apparatus and method for lubricating a wheel having a predetermined wheel diameter and width includes a lubricating head for encircling the wheel to be lubricated. First and second lubricating rings are supported on the head. The first and second rings have a common axis and are spaced apart an axial distance from one another complementary with respect to the predetermined width of the wheel to be lubricated. Each of the first and second rings has a diameter greater than the predetermined diameter of the wheel to be lubricated. A mechanism is provided for driving the wheel to be lubricated into operable engagement with the first and second rings of the head, such that the first and second rings of the head operably engage along an entire periphery with respect to the first and second rims of the wheel. Preferably, the mechanism rotates the wheel through at least 360° while in engagement with the first and second rings of the lubricating head to apply lubricant to an entire periphery of the first and second rims of the wheel.

20 Claims, 3 Drawing Sheets

WHEEL RIM SOAPER

FIELD OF THE INVENTION

The present invention is directed to an apparatus for applying a liquid soap or lubricant composition on the rim of a vehicle wheel on a mass production basis.

BACKGROUND OF THE INVENTION

It is conventional in the automotive industry to apply a soap or lubricant composition to the rim of a wheel to facilitate the mounting of a tire on the wheel. Various machines have been developed for soaping wheel rims on a mass production basis, however, for true mass production line use, the soaper must be able to handle several different models or sizes of wheels whose outside diameter, axial width, and center hole diameter will differ from each other over ranges as large as 4 or 5 inches. A set of standard steel wheels for an economy car may be followed through the soaper by a set of optional solid aluminum wheels of substantially greater axial width. This procedure does not allow for any adjustment or resetting of the wheel engaging parts of the soaper to accommodate for dimensional differences and the soaper must thus be capable of accepting and handling wheels having outside diameters, axial widths and central hole openings falling anywhere within pre-selected dimensional ranges. The problems associated with wheel soaping and tire soaping have been considered in the prior art, see for example U.S. Pat. No. 4,723,563; U.S. Pat. No. 4,843,159; and U.S. Pat. No. 5,642,790.

SUMMARY OF THE INVENTION

The present invention is directed to a wheel soaping apparatus in which wheels of different diameters, falling within a relatively large size range are positioned relative to an axis of rotation and in which wheels of axial widths falling within a relatively large size range are accommodated by adjustable spacing between associated soaping elements. In accordance with the present invention, wheels to be soaped are fed horizontally along a conveyor into underlying relationship to a soaping reciprocal head. The conveyor defines a fixed path of travel for each wheel to be lubricated and includes a lubricating station on the fixed path. The head is positioned at the lubricating station and has a common axis for first and second lubricating rings. The first and second lubricating rings are spaced apart and have an adjustable axial distance with respect to one another complementary to the predetermined wheel width of the wheel to be lubricated. Each of the first and second rings has a diameter greater than a predetermined wheel diameter of the wheel to be lubricated. A mechanism is provided for reciprocating the head between a first position spaced from the conveyor and a second position adjacent to the conveyor, such that the first and second rings encircle the wheel to be lubricated when the wheel to be lubricated is positioned at the lubricating station and the head is in the second position. Another mechanism is provided for driving the wheel to be lubricated when the wheel to be lubricated is positioned at the lubricating station. The driving mechanism moves the wheel to be lubricated into operable engagement with the first and second rings of the lubricating head, such that the first and second rims of the wheel to be lubricated operably engage with the first and second lubricating rings along an entire periphery of the wheel to be lubricated.

In the preferred configuration, the driving mechanism can include a shaft having an axis of rotation and a crank arm connected to the shaft for rotation therewith. A wheel-engaging surface is associated with the crank arm. A motor is provided for rotating the shaft through at least 360° to bring the entire periphery of the first and second rims of the wheel to be lubricated into contact with the first and second rings of the lubricating head. A frame supports the motor, shaft and crank arm with respect to the conveyor. The frame is moveable between a raised position with the crank arm extending above the conveyor position within an interior of the wheel to be lubricated when positioned at the lubricating station and a lowered position with the crank arm retracted below the transport surface of the conveyor. The frame is also moveable when in the raised position between an offset position with the axis of rotation of the shaft offset with respect to the common axis of the first and second rings of the lubricating head, and a centered position with the axis of rotation of the shaft coaxial with the common axis of the first and second rings of the lubricating head. Mechanisms are provided for axially moving the frame between the raised position and the lowered position, and for moving the frame transversely with respect to the fixed path of the conveyor between the centered position and the offset position for engaging the wheel-engaging surface associated with the crank arm with respect to an interior surface of the wheel to be lubricated when the frame is in the centered position with the shaft coaxial with a common axis of the first and second rings of the lubricating head.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
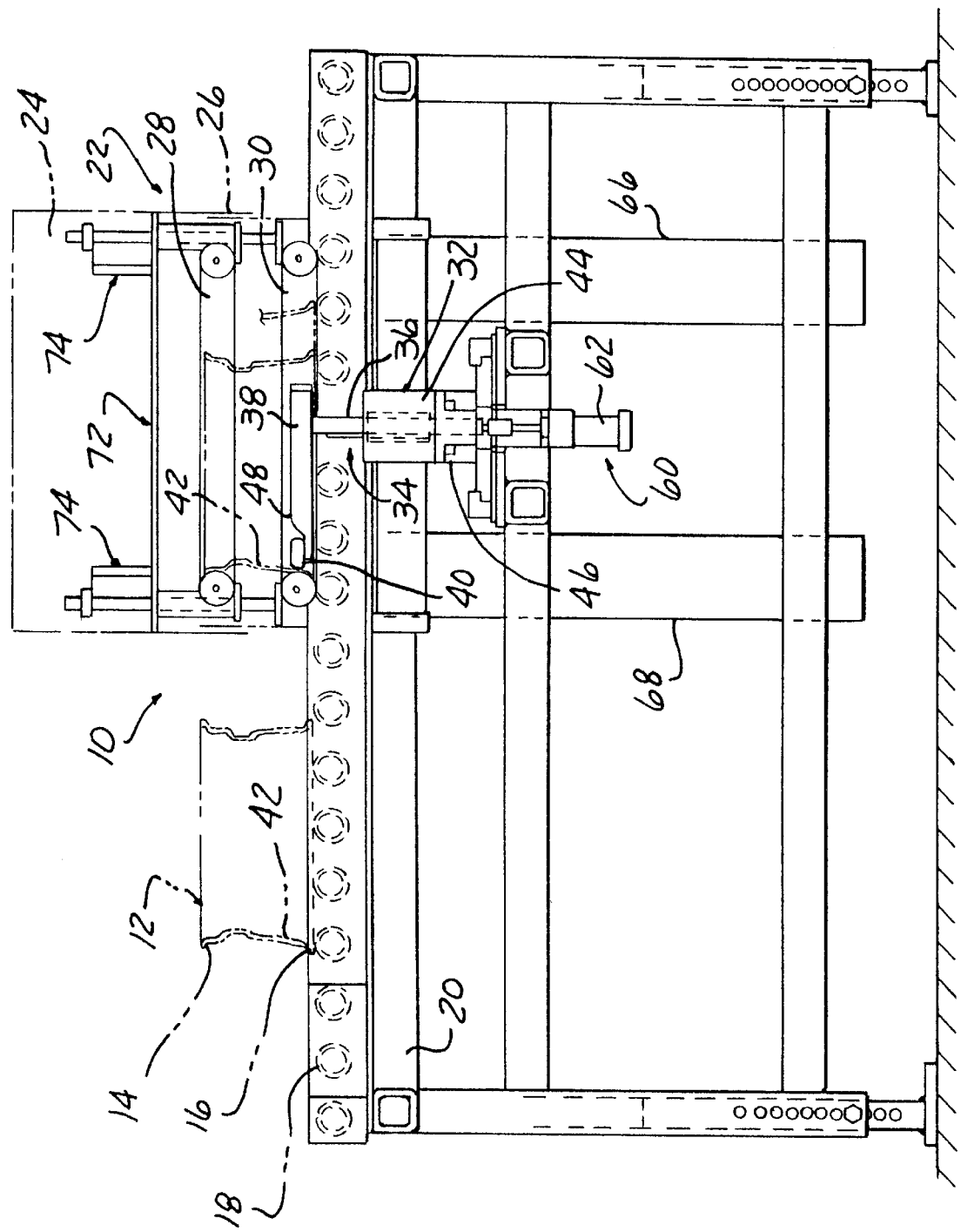
FIG. 1 is a side elevational view of an apparatus for lubricating a wheel having a predetermined wheel diameter and width according to the present invention.
Figure 2:
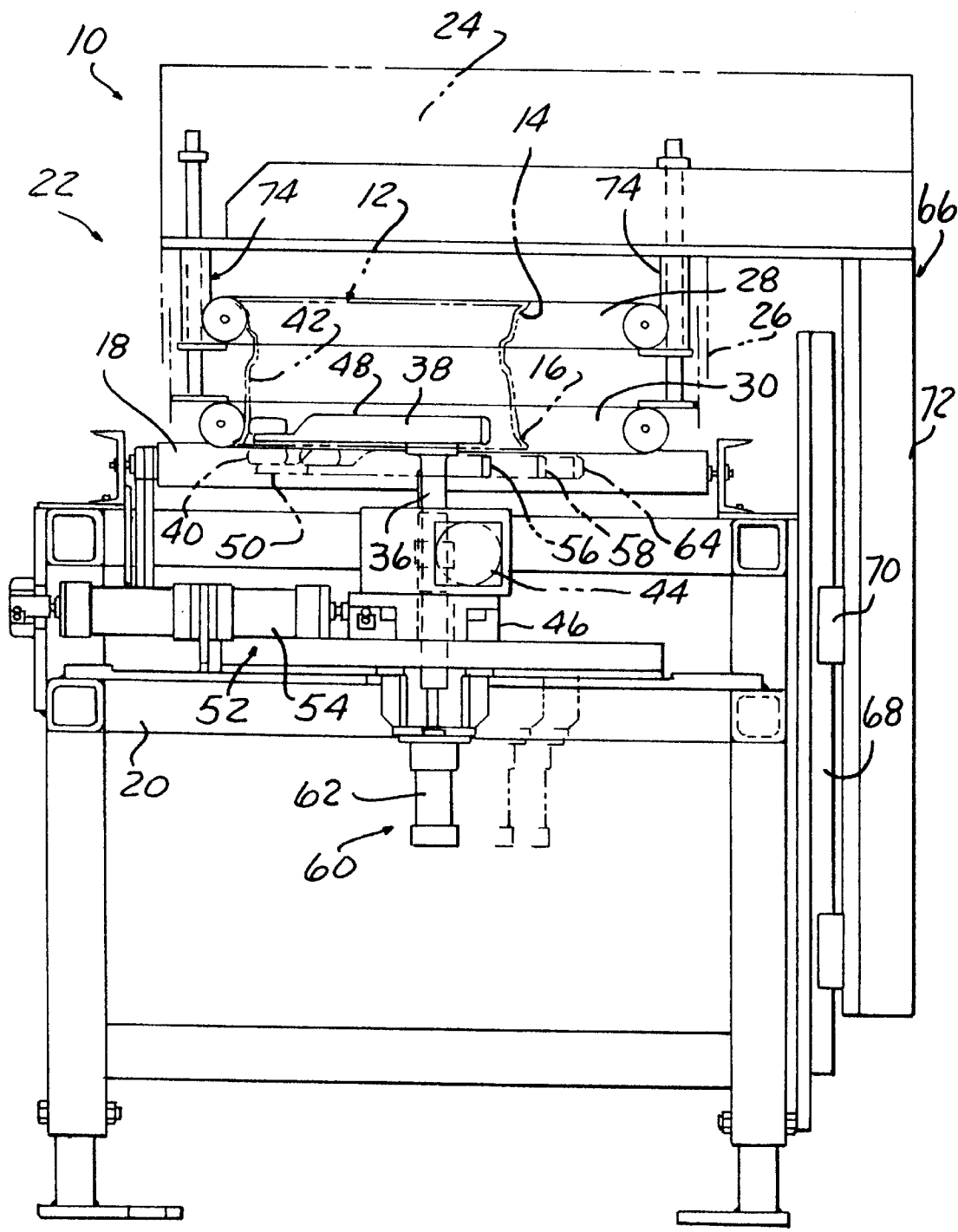
FIG. 2 is an end view of the apparatus illustrated in FIG. 1.

An apparatus 10 is illustrated in FIGS. 1 and 2 for lubricating a wheel 12 having a predetermined diameter and width. The wheel 12 also includes first and second rims 14, 16 spaced apart from one another. A conveyor 18 is mounted on a stationary frame 20. The conveyor 18 defines a fixed path of travel for each wheel 12 to be lubricated and includes a lubrication workstation 22 on the fixed path. The wheel soaper 24 according to the present invention is located at the lubrication workstation 22. The wheel soaper 24 includes a lubricating head 26 for encircling a wheel 12 to be lubricated. The lubricating head 26 supports first and second lubricating rings 28, 30 in positions to be operably engaged with the first and second rims 14, 16 of the wheel 12 to be lubricated. The first and second rings 28, 30 have a common axis and are spaced apart an axial distance from one another complementary with respect to the predetermined width of the wheel 12 to be lubricated. Preferably, the axial distance between the first and second rings 28, 30 is adjustable to accommodate wheels 12 of varying width so that the wheel soaper 24 according to the present invention can automatically adapt to wheels 12 having varying predetermined wheel diameters and widths placed in any sequence for delivery along the fixed path of the conveyor 18. Each of the first and second rings 28, 30 has a diameter greater than the predetermined diameter of the wheel 12 to be lubricated. Means 32 is provided for driving the wheel 12 to be lubricated into operable engagement with the first and second rings 28, 30 of the head 26, such that the first and second rings 28, 30 of the head 26 operably engage along an entire periphery with respect to the first and second rims 14, 16 of the wheel 12.

In the preferred embodiment, the driving means 32 can include means 34 for rotating the wheel 12 through at least 360° while in engagement with the first and second rings 28, 30 of the lubricating head 36 to apply lubricant to an entire periphery of the first and second rims 14, 16 of the wheel 12. The rotating means 34 can include a shaft 36 having an axis of rotation and a crank arm 38 connected to the shaft 36 for rotation therewith. A wheel-engaging surface 40 is associated with the crank arm 38 for contacting an interior surface 42 of the wheel 12. A motor 44 rotates the shaft 36 through at least 360°. A frame 46 supports the motor 44, shaft 36 and crank arm 38. The frame 46 is moveable between a raised position 48, where the crank arm 38 extends within the wheel 12 to be lubricated, and a lowered position 50, where the crank arm 38 is held clear of the wheel 12. First means 52 is provided for moving the frame 46 axially with respect to the axis of rotation of the shaft 36 between the raised position 48 and lowered position 50. In the preferred configuration, the first moving means 52 includes a first fluid operated actuator 54 having at least one piston and cylinder for reciprocal movement between first and second end limits of movement corresponding to the raised position 48 and lowered position 50 of the frame 46.

In the preferred configuration, the frame 46 is also moveable between a centered position 56 (best seen in FIG. 1), where the axis of rotation of the shaft 36 is coaxial with the common axis of the first and second rings 28, 30 of the lubricating head 26, and an offset position 58 (best seen in FIG. 2), where the axis of rotation of the shaft 36 is offset with respect to the common axis of the first and second rings 28, 30 of the lubricating head 26. Second means 60 is provided for moving the frame 46 radially with respect to the common axis between the centered position 56 and the offset position 58 for engaging the wheel-engaging surface 40 of the crank arm 38 with respect to the interior surface 42 of the wheel 12 to be lubricated. In the preferred configuration, the second moving means 60 includes a second fluid operated actuator 62 having at least one piston and cylinder for reciprocal movement between first and second end limits of movement corresponding to the centered position 56 and offset position 58 of the frame 46. Preferably, the second moving means 60 is also capable of moving the frame 46 radially with respect to the common axis of the shaft 36 between a return position 64, where the wheel 12 is returned to a predetermined position after lubrication of the wheel 12, and the offset position 58 and/or the centered position 56.

The return position 64 can reset the wheel 12 to a predetermined position after lubrication with respect to the conveyor 18 allowing the lubricated wheel 12 to be removed from the workstation simultaneously as a new wheel 12 to be lubricated is positioned at the lubrication workstation 22 on the fixed path of travel of the conveyor 18. Means 66 is provided for reciprocating the lubricating head 26 between a first position, where the head 26 is spaced from the conveyor 18, and a second position (illustrated in FIGS. 1 and 2), where the head 26 is disposed adjacent to the conveyor 18 and encircling the wheel 12 to be lubricated. The reciprocating means 66 can include at least one guide rail 68 for operably engaging at least one slide block 70 to support a second moveable frame 72 in movement between first and second positions. The lubricating head 26 can be supported on the second moveable frame 72. An appropriate actuator can be provided for driving the second moveable frame 72 to move the lubricating head 26 between the first and second positions. Means 74 is provided for adjusting the axial distance of the first and second lubricating rings 28, 30 with respect to one another to accommodate wheels 12 having different predetermined widths. The adjusting means 74 moves at least one of the rings 28, 30 with respect to the other ring to either narrow or widen the axial distance between the two rings in order to match the width of the wheel 12 to be lubricated as it is positioned at the lubrication workstation 22 along the conveyor 18. Preferably, the wheel soaper 24 according to the present invention is capable of adapting to different wheel diameters and widths automatically as the wheels are fed in random combinations along the conveyor 18 to the lubrication workstation 22. Appropriate sensors and controls are commercially available for determining the width and diameter of the wheel entering the lubrication workstation 22, and such sensors and controls are considered to be within the level of those skilled in the art.

In operation, the wheel soaper 24 according to the present invention discloses a method for lubricating a wheel 12 having a predetermined wheel diameter and width. The wheel 12 includes first and second rims 14, 16 spaced apart from one another. The various driving elements of the wheel soaper 24 can be powered by pressurized fluid, such as compressed air or hydraulic fluid, or electrically operated motors, with conventional mechanical and/or electrical control mechanisms. The method of lubricating the wheel according to the present invention includes the steps of encircling the wheel 12 to be lubricated with a lubricating head 26, supporting first and second lubricating rings 28, 30 on the lubricating head 26, where the first and second rings 28, 30 have a common axis and are spaced apart an axial distance from one another complementary with respect to the predetermined width of the wheel 12 to be lubricated. Each of the first and second rings 28, 30 have a diameter greater than the predetermined diameter of the wheel 12 to be lubricated. The method according to the present invention also includes the step of driving the wheel 12 to be lubricated into operable engagement with respect to the first and second rings 28, 30 of the lubricating head 26, such that the first and second rings 28, 30 of the head 26 operably engage along an entire periphery with respect to the first and second rims 14, 16 of the wheel 12.

In the preferred configuration, the driving step can further include the step of rotating the wheel 12 through at least 360° with respect to the lubricating head 26 to apply lubricant to an entire periphery of the first and second rims 14, 16 of the wheel 12. The driving or rotating step preferably is accomplished by moving a crank arm 38 to engage an interior surface 42 of the wheel 12 to be lubricated for driving the wheel 12 with respect to the lubricating head 26. The moving step can include moving the crank arm 38 radially with respect to a common axis of the first and second rings 28, 30 of the lubricating head 26 to operably engage the first and second rims 14, 16 of the wheel 12 to be lubricated with the first and second rings 28, 30 of the lubricating head 26, respectively. The moving step can also include the step of moving the crank arm rotationally about the common axis of the first and second rings 28, 30 of the lubricating head 26 for driving the first and second rims 14, 16 of the wheel 12 in rotation with respect to the first and second rings 28, 30 of the lubricating head 26 to apply lubricant along an entire periphery of the first and second rims 14, 16 of the wheel 12. The moving step can further include the step of moving the crank arm 38 radially to return the wheel to a predetermined position after the first and second rims 14, 16 of the wheel 12 have been lubricated. The method of the present invention can further include the step of supplying pressurized lubricating fluid to the first and second rings 28, 30 of the lubricating head 26.

The wheel 12 to be lubricated according to the present method is preferably conveyed along a conveyor 18 defining a fixed path of travel for each wheel 12 to be lubricated. The conveyor 18 includes a lubrication workstation 22 on the fixed path. As the wheel 12 to be lubricated is conveyed along the conveyor 18, the wheel 12 is positioned at the lubrication workstation 22. The lubricating head 26 is reciprocated between a first position, where the head 26 is spaced from the conveyor 18, and a second position, where the head 26 is disposed adjacent to the conveyor 18 and encircles the wheel 12 to be lubricated.

The crank arm 38 is raised from a position disposed below the conveying surface of the rollers of the conveyor 18 to a position within the interior of the wheel 12 by controlled operation of the first fluid operated actuator 54. When in the raised position 48, the crank arm 38 is initially in the offset position 58, such that the crank arm 38 is disposed spaced from the interior surface 42 of the wheel 12 to be lubricated. Controlled actuation of the second fluid operated actuator 62 drives the crank arm 38 radially to engage the wheel-engaging surface 40 of the crank arm 38 with an interior surface 42 of the wheel 12 to be lubricated. As the crank arm 38 moves to the centered position 56, the wheel 12 to be lubricated is driven into engagement with the first and second lubricating rings 28, 30 of the lubricating head 26. When in the raised position 48 and centered position 56, the first and second rims 14, 16 of the wheel 12 are in lubricating engagement with the first and second lubricating rings 28, 30 of the lubricating head 26. The shaft 36 is then rotated by motor 44 to drive the crank arm 38 rotationally about an axis coaxial with the common axis of the first and second lubricating rings 28, 30 of the lubricating head 26. The rotational action of the crank arm on the interior surface 42 of the wheel 12 causes the wheel 12 to rotate with respect to the stationary first and second lubricating rings 28, 30 of the lubricating head 26 thereby causing lubricant to be applied to an entire periphery of the first and second rims 14, 16 of the wheel 12. After the crank arm 38 has rotated through at least 360°, the entire periphery of the first and second rims 14, 16 of the wheel 12 has been lubricated. Controlled operation of the second fluid operated actuator 62 drives the crank arm 38, while in the raised position 48, from the centered position 56 to the return position 64 in order to place the lubricated wheel 12 in a centered position with respect to the conveyor 18 prior to discharging or removing the lubricated wheel 12 from the lubrication workstation 22.

After the wheel 12 has been moved to the return or reset position 64, the first fluid operated actuator 54 is operated to move the crank arm 38 from the raised position 48 to the lowered position 50 in order to prepare for the discharge of the lubricated wheel 12 from the lubrication workstation 22. The crank arm 38 is then moved from the return position 64 to the offset position 58 prior to repeating the lubricating cycle described above. When in the offset position 58 and lowered position 50, the crank arm 38 is in a ready position to be raised within the interior of a new wheel 12 to be lubricated once the wheel 12 is positioned at the lubrication workstation 22 by the conveyor 18.

The method according to the present invention for lubricating a wheel also includes the step of adjusting the axial distance between the first and second rings 28, 30 of the lubricating head 26 to accommodate different wheel widths passing along the conveyor 18 through the lubrication workstation 22 to be lubricated. Further, the controlled actuation of the actuators 54, 62 are adapted to automatically handle any wheel diameter that falls in the range of less than the diameter of the first and second lubricating rings 28, 30 and greater than twice the distance between the rotational axis of the crank arm 38 and the wheel-engaging surface 40 of the crank arm 38. It should be recognized that the motion of the crank arm 38 is adapted to drive a wheel 12 of any diameter falling within this range into operable engagement with the lubricating rings 28, 30 and rotation through at least 360° causes lubricant to be applied to the entire periphery of the first and second rims 14, 16 of the wheel 12 regardless of the diameter. In this way, the present invention is adapted to be capable of soaping wheels of different diameters, falling within a relatively large size range. In addition, the present invention is adapted to accept wheels of different axial widths falling within a relatively large size range by adjusting the axial spacing between the associated soaping elements.

Figure 3:
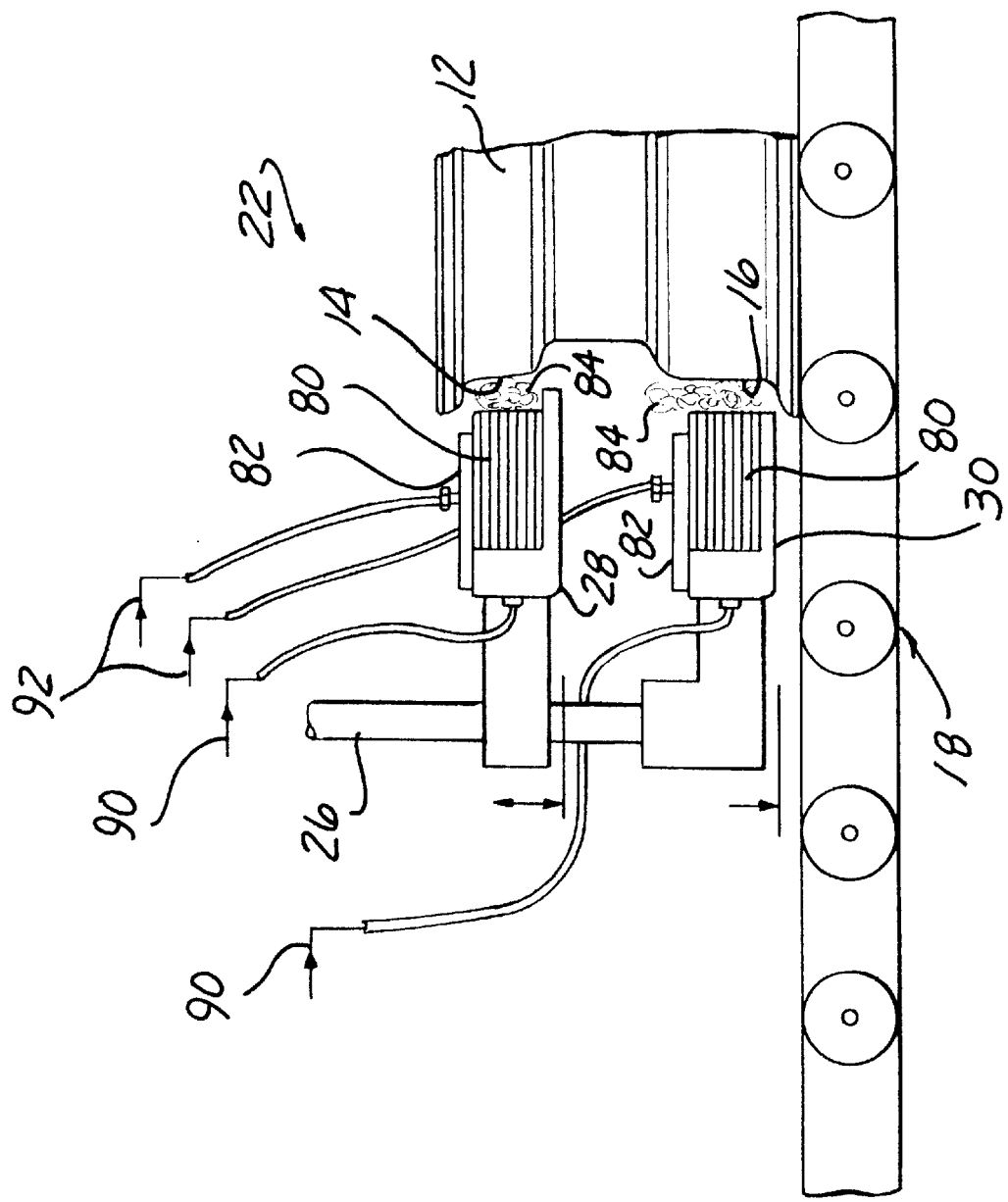
FIG. 3 is a detailed side elevational view of an alternative configuration of the apparatus for lubricating a wheel according to the present invention.

Referring now to FIG. 3, an alternative configuration of the apparatus for lubricating a wheel is shown in detail side elevational view. Through experimentation and testing, it has been found that the preferred apparatus and method for applying the lubricant includes the use of a porous applicator, such as felt, foam rubber-open type cell, or sponge-type material. The porous applicator material 80 is mounted to a holder or bracket 82. The holder or bracket 82 serves as manifold with associated passages 90, 92 to introduce fluid lubricant and compressed air to the porous applicator material 80. Preferably, the porous applicator material 80 and bracket 82 are formed to define first and second lubricating rings 28 and 30 as previously described. It is has been discovered that using fluid lubricant alone wastes too much fluid lubricant because of low viscosity causing applicator runoff. Advantageously, it has been discovered that by applying compressed air after injecting a shot of fluid lubricant or liquid, a foam is produced in the porous applicator material 80. The foam 84 is a more forgiving fluid medium able to conform to uneven surfaces and is easier to transfer from the applicator material 80 to the first and second rims 14, 16 of the wheel 12. Fluid lubricant alone has a tendency to only transfer when an exact match of the two surfaces is achieved. The present invention provides mixing action to create the foam 84 and this mixing occurs internal with respect to the media of the porous applicator material 80. In operation, the wheel 12 to be lubricated is conveyed along a conveyor 18 defining the fixed path of travel as described in greater detail above. After the wheel 12 is positioned at the lubrication workstation 22, the lubricating head 26 is reciprocated between a first position, where the head 26 is spaced from the conveyor 18, and a second position, where the head 26 is disposed adjacent to the conveyor 18 and encircles the wheel 12 to be lubricated.

In the preferred configuration of FIG. 3, the lubricating head 26 includes two brackets 82 defining first and second rings 28, 30. Each bracket 82 includes a manifold for distributing lubricating fluid and compressed air to the porous applicator media 80 to produce foam 84 operably engageable with the first and second rims 14, 16 of wheel 12 when engaged with the first and second lubricating rings 28, 30. The wheel 12 is positioned in operable contact with the lubricating rings 28, 30 for the application of lubricating fluid through the foam 84 to the first and second rims 14, 16 of the wheel 12.

Preferably, the wheel 12 is driven into engagement with the lubricating rings 28, 30 as described in greater detail above. However, it should be recognized that the location of the driving means 32, best seen in FIG. 2, can be relocated in either embodiment to engage from the side of the wheel 12 opposite from the conveyor 18, rather than from the conveyor-side of the wheel 12 as illustrated. In either case, the brackets 82 are adjustable with respect to one another to accommodate wheels 12 of varying width configurations. As previously indicated, the lubricating rings 28, 30 are of sufficient diameter to encompass the largest wheel diameter size to be lubricated. The width adjustment of the lubricating rings 28, 30 can be manual or automated. No adjustment is necessary to the fixed diameter of the lubricating rings 28, 30, since the wheel 12 is driven into operable engagement with the lubricating rings 28, 30 regardless of the wheel diameter size. Further details regarding the wheel driving means 32, rotating means 34, first means 52, second means 60 and reciprocating means 66 can be obtained from the detailed description of the embodiment illustrated in FIGS. 1 and 2, which is the preferred configuration of wheel engagement with the lubricating rings 28, 30 in the configuration illustrated in FIG. 3.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for lubricating a wheel having a predetermined wheel diameter and width, the wheel further having first and second rims spaced apart from one another, the apparatus comprising:

a lubricating head for encircling a wheel to be lubricated;

first and second lubricating rings supported on the head, the first and second rings having a common axis and spaced apart an axial distance from one another complementary with respect to the predetermined width of the wheel to be lubricated, each of the first and second rings having a diameter greater than the predetermined diameter of the wheel to be lubricated; and means for driving the wheel to be lubricated into operable engagement with the first and second rings of the head, such that the first and second rings of the head operably engage along an entire periphery with respect to the first and second rims of the wheel.

2. The apparatus of claim 1 wherein the driving means further comprises:

means for rotating the wheel through at least 360° while in engagement with the first and second rings of the lubricating head to apply lubricant to an entire periphery of the first and second rims of the wheel.

3. The apparatus of claim 2 wherein the rotating means further comprises:

a shaft having an axis of rotation;

a crank arm connected to the shaft for rotation therewith;

a wheel-engaging surface associated with the crank arm;

a motor for rotating the shaft through at least 360°;

a frame for supporting the motor, shaft, and crank arm, the frame moveable between a raised position, where the crank arm extends within the wheel to be lubricated, and a lowered position, where the crank arm is held clear of the wheel; and first means for moving the frame axially between the raised position and the lowered position.

4. The apparatus of claim 3 wherein the first moving means further comprises:

a fluid operated actuator having at least one piston and cylinder for reciprocal movement between first and second end limits of movement corresponding to the raised and lowered positions of the frame.

5. The apparatus of claim 3 further comprising:

the frame moveable between a centered position, where the axis of rotation of the shaft is coaxial with the common axis of the first and second rings, and an offset position, where the axis of rotation of the shaft is offset with respect to the common axis of the first and second rings; and second means for moving the frame radially with respect to the common axis between the centered position and the offset position for engaging the crank arm with respect to the wheel to be lubricated.

6. The apparatus of claim 5 wherein the second moving means further comprises:

a fluid operated actuator having at least one piston and cylinder for reciprocal movement between first and second end limits of movement corresponding to the centered and offset positions of the frame.

7. The apparatus of claim 5 further comprising:

the second means for moving the frame radially with respect to the common axis between a return position, where the wheel is returned to a predetermined position after lubrication of the wheel, and the offset position.

8. The apparatus of claim 1 further comprising:

a conveyor defining a fixed path of travel for each wheel to be lubricated and including a lubrication work station on the fixed path.

9. The apparatus of claim 8 further comprising:

means for reciprocating the head between a first position, where the head is spaced from the conveyor, and a second position, where the head is disposed adjacent to the conveyor and encircling the wheel to be lubricated.

10. The apparatus of claim 1 further comprising:

means for adjusting the axial distance of the first and second lubricating rings with respect to one another to accommodate wheels having different predetermined widths.

11. A method for lubricating a wheel having a predetermined wheel diameter and width, the wheel further having first and second rims spaced apart from one another, the method comprising the steps of:

encircling a wheel to be lubricated with a lubricating head;

supporting first and second lubricating rings on the lubricating head, the first and second rings having a common axis and spaced apart an axial distance from one another complementary with respect to the predetermined width of the wheel to be lubricated, each of the first and second rings having a diameter greater than the predetermined diameter of the wheel to be lubricated; and driving the wheel to be lubricated into operable engagement with respect to the first and second rings of the lubricating head, such that the first and second rings of the head operably engage along an entire periphery with respect to the first and second rims of the wheel.

12. The method of claim 11 wherein the driving step further comprises the step of:

rotating the wheel through at least 360° with respect to the lubricating head to apply lubricant to an entire periphery of the first and second rims of the wheel.

13. The method of claim 11 further comprising the step of:

moving a crank arm to engage an interior surface of the wheel for driving the wheel with respect to the lubricating head.

14. The method of claim 13 wherein said moving step further comprises the step of:

moving the crank arm radially with respect to the common axis of the first and second rings of the lubricating head to operably engage the first and second rims of the wheel to be lubricated with the first and second rings of the lubricating head respectively.

15. The method of claim 13 wherein the moving step further comprises the step of:

moving the crank arm rotationally about the common axis of the first and second rings of the lubricating head for driving the first and second rims of the wheel in rotation with respect to the first and second rings of the lubricating head to apply lubricant along an entire periphery of the first and second rims of the wheel.

16. The method of claim 15 wherein the moving step further comprising the step of:

moving the crank arm radially to return the wheel to a predetermined position after the rims have been lubricated.

17. The method of claim 11 further comprising the step of:

adjusting the axial distance between the first and second rings of the head.

18. The method of claim 11 further comprising the steps of:

positioning the wheel to be lubricated at a lubrication station; and removing the lubricated wheel from the lubrication station.

19. The method of claim 11 further comprising the steps of:

supplying pressurized lubricating fluid to the first and second rings of the head.

20. The method of claim 11 further comprising the steps of:

conveying the wheel to be lubricated along a conveyor defining a fixed path of travel for each wheel to be lubricated and including a lubrication work station on the fixed path; and reciprocating the lubricating head between a first position, where the head is spaced from the conveyor, and a second position, where the head is disposed adjacent to the conveyor and encircling the wheel to be lubricated.

* * * * *